April 16, 1935.   W. B. WARREN   1,998,110
FLOWMETER
Filed March 7, 1928
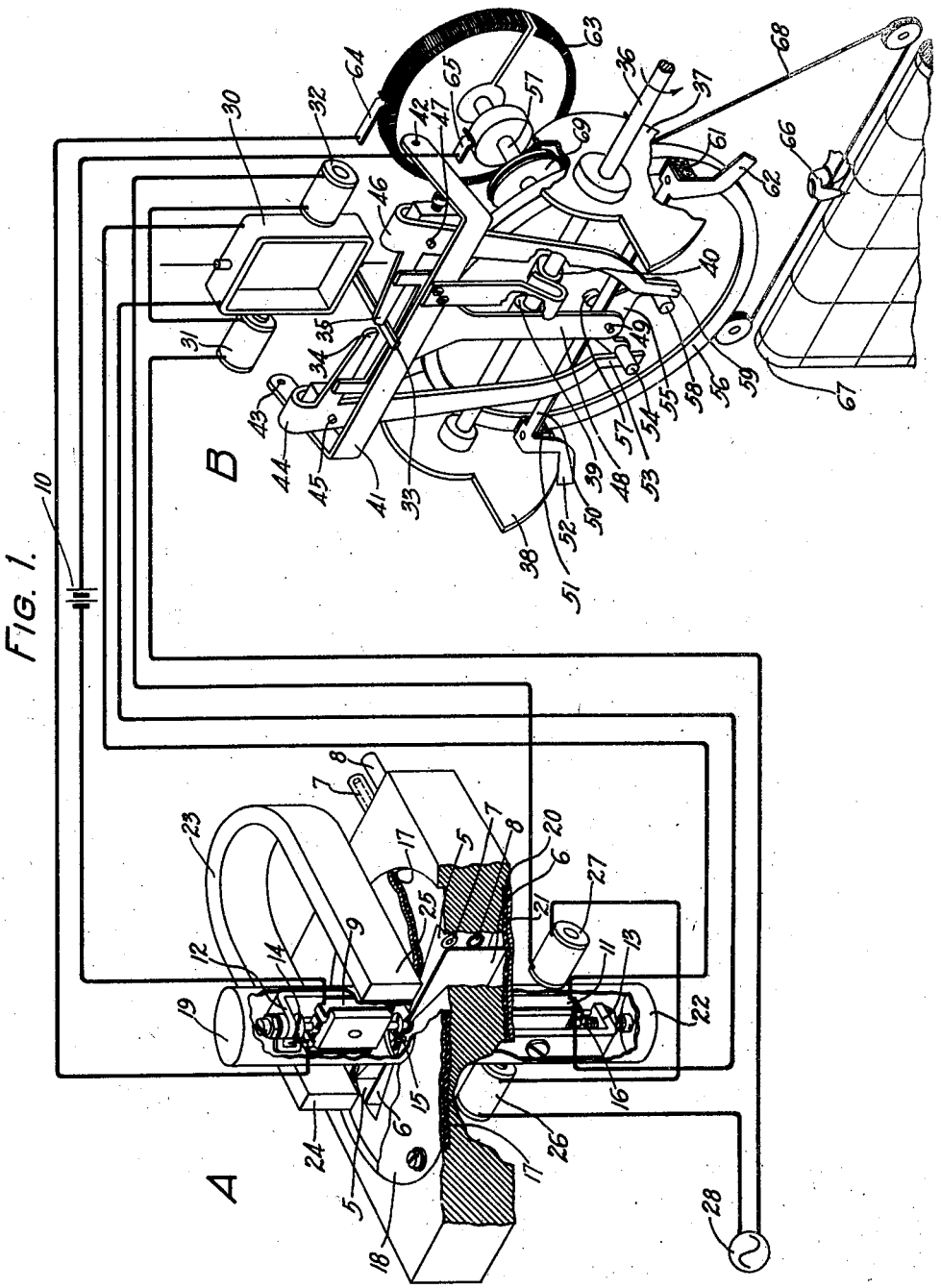
INVENTOR
WILLIAM B. WARREN
BY
Walter C. Kiesel
ATTORNEY Patented Apr. 16, 1935

1,998,110

UNITED STATES PATENT OFFICE 1,998,110

FLOWMETER

William B. Warren, Brooklyn, N. Y., assignor to Bell Telephone Laboratories, Incorporated, New York, N. Y., a corporation of New York Application March 7, 1928, Serial No. 259,761

2 Claims. (Cl. 177—351)

This invention relates to recording flowmeters and has as its object the accurate indicating and recording of the flow of a fluid.

A flowmeter constructed according to this invention is particularly adapted to measure low rates of flow of fluids and to record the rates of flow on a standard Leeds and Northrup curve drawing Wheatstone bridge recorder.

According to one embodiment of this invention a flowmeter for measuring gas contains a very light vane supported between jeweled bearings. The gas enters the flowmeter through a tube of such size as to give a certain velocity to the gas as it enters the meter. On entering the meter the gas strikes against the vane and causes it to move from any position of rest to a position of equilibrium where the force of the gas is balanced by the torque of the suspension of the vane. At any velocity of flow there is a definite force exerted by the gas impinging on the vane and a corresponding movement of the vane from its zero position. The force exerted and the movement of the vane are proportional to the rate of flow of the gas.

Attached rigidly to the vane are two coils, one an alternating current coil surrounded by an alternating current field and the other a direct current coil surrounded by a permanent magnet field. The movement of the vane causes an induced current to flow in the alternating current coil and in a recorder coil associated with it, thereby causing the recorder coil to move and vary a resistance associated with the direct current coil. This causes an increased current to flow in the direct current coil which in turn causes the direct current coil to return the vane to its zero position. The amount of current required to return the direct current coil to its zero position is proportional to the rate of the gas flow and this is indicated by the position of the resistance varying member with which a recording pen is associated.

On the attached drawing, section A represents a flowmeter constructed according to this invention with a portion broken away and section B represents a standard Leeds and Northrup curve drawing Wheatstone bridge recorder.

Referring to section A of the drawing, 5 is a gas tight compartment within which vane 6 rotates. Tube 7 is provided for the entry of the gas into compartment 5 and 8 is a tube through which the gas leaves after being deflected by the surface of vane 6. Attached to the upper portion of vane 6 is an electric coil 9 through which direct current supplied by battery 10 flows. Attached to the lower portion of vane 6 is an electric coil 11. The two coils 9 and 11 are arranged to rotate with vane 6 and are suspended between jewelled bearings at supports 12 and 13. Watch springs 14, 15 and 16 are provided for holding the vane 6 and attached coils 9 and 11 against the inner portion of gas tubes 7 and 8 at zero flow of gas. A rubber gasket 17 fits tightly over the top portion of compartment 5 and is held in place by a closely fitting brass cover 18. Extending into gasket 17 and plate 18 is a brass cylinder 19 which is closed at its upper end. This cylinder 19 surrounds coil 9 and its support 12 and cooperates with gasket 17 and plate 18 to make the upper portion of compartment 5 gas tight. Similarly rubber gasket 20 and plate 21, only a portion of which are shown, cooperate with brass cylinder 22 which surrounds coil 11 and its support 13 to make the lower portion of compartment 5 gas tight. By means of the rubber gaskets 17 and 20, brass plates 18 and 21 and brass cylinders 19 and 22, the gas which enters tube 7 is confined to the area within the compartment 5 and cylinders 19 and 22 and can only escape through tube 8. A permanent magnet 23 has its pole pieces 24 and 25 arranged on either side of coil 9. The polarity of battery 10 is such that the flow of current through coil 9 will tend to oppose the magnetic field of magnet 23. The cylinder 19 which surrounds coil 9 being brass does not interfere with the magnetic flux through coil 9 produced by magnet 23. Arranged on either side of coil 11 are electrical coils 26 and 27 which are connected in series relation and through which alternating current produced by generator 28 flows.

Referring now to section B of the drawing 30 is an electrical coil suspended in a Leeds and Northrup curve drawing Wheatstone bridge recorder. The suspension supports are not shown since they are not necessary for a clear understanding of the operation of the device. Coil 30 is connected in series relation with coil 11 of the flowmeter. Arranged on either side of coil 30 are electrical coils 31 and 32 which are connected in series relation with each other and with coils 26 and 27 of the flowmeter. Attached to the lower portion of coil 30 is pointer 33 which normally lies just beneath the opening between arms 34 and 35. Upon oscillation of coil 30, pointer 33 rests either below arm 34 or arm 35. Shaft 36 is adapted to be rotated in a counter-clockwise direction by an electric motor which is not shown. 37, 38, 39 and 40 are cams which are carried by shaft 36. On each revolution of the shaft 36 cam 40 raises lifter bar 41 which pivots about points 42 and 43. The lifter bar 41 when the coil 30 is in its normal position as shown by the drawing, lifts pointer 33 into the space between arms 34 and 35. If pointer 33 due to movement of coil 30 lies underneath arm 34 or 35, the lifter bar 41 will press it against the arm under which it may be lying. Arm 34 is part of an L-shaped structure 44 which pivots about point 45. Arm 35 is part of a similar L-shaped structure 46 and pivots about point 47. 48 is a spring bar which is moved by cam 39 at the same time that cam 40 lifts lifter bar 41. Attached to the lower end of spring bar 48 and pivoting about 49 is a horizontal bar 50 on the ends of which are placed cork pads 51 and 61 and horn extensions 52 and 62. As long as the cam 39 holds the spring bar 48 in moved position the horizontal bar 51 is able to pivot about 49. If pointer 33 is lifted against arm 34, for example, the L-shaped structure 44 is rotated about point 45 and its lower end 53 is pressed against the post 54 which is fastened to one end of extension 55 of horizontal bar 50. This causes the horizontal bar 50 to turn about its pivot 49 in a counterclockwise direction, lowering horn extension 52 and raising horn extension 62. 58 is a post attached to the other end of extension 55 and is adapted to be moved by the lower end 59 of L-shaped structure 46 in the same way that post 54 is moved by lower end 53 of L-shaped structure 44. At this point the shaft 36 having continued rotating the cam 39 releases spring bar 48 and the spring action of the spring bar causes it to press horizontal bar 50 inwardly causing cork pads 51 and 61 to press firmly against disk 56 which is adapted to rotate about its shaft 57. The cams 37 and 38 are next rotated by shaft 36 and since, due to movements started by pointer 33 being placed under arm 34, horn extension 62 has been raised and placed near cam 37 while horn extension 52 has been lowered and thus removed from cam 38, on the rotation of shaft 36, cam 37 bears against horn extension 62 and returns the horizontal bar 50 to its normal horizontal position. During this time the cork pads 51 and 61 have been pressed firmly against disk 56 and the movement of horizontal bar 50 causes disk 56 to rotate. Mounted on shaft 57 is a resistance unit 63 which is rotated by the movement of disk 56. Contact with the rotatable resistance unit is made through contact brushes 64 and 65 and through these brushes the resistance unit is connected in series relation with the battery 10 and coil 9 of the flowmeter. The amount of rotation given to horizontal bar 50 and disk 56 depends upon the degree of movement of coil 30 since the pointer 33 carried by the coil approaches the fulcrum of the L-shaped levers 44 or 46 on movement of the coil and the greater the movement of the coil the greater the movement of bar 50 from its normal horizontal position and the correspondingly greater rotation of disk 56 and resistance unit 63. It is thus seen that the resistance unit 63 is rotated to a degree which is a function of the angular displacement of the coil 30. 66 is a recorder pen which is moved across recorder drum 67 by means of cord 68 which is looped around drum 69 on shaft 57. This pen moves with the shaft and thus indicates the movement of the vane. The drum 67 is a typical recording drum and rotates in the well known manner so as to give a record of the movement of pen 66 as a function of time.

When gas enters compartment 5 through tube 7 it strikes against vane 6 and is deflected leaving the compartment through tube 8. The pressure of the gas causes vane 6 to move from its zero position where it is normally held by the watch springs 14, 15 and 16. The greater the rate of flow of gas, the stronger the pressure and the greater the deflection of the vane. Coil 11 attached rigidly to the vane moves with it and changes its position with respect to the alternating current field produced by alternating current coils 26 and 27. This causes a current to be induced in coil 11, the strength of which is proportional to the degree of movement. Since coil 30 which in this case is associated with the recorder is connected in series relation with coil 11 and is suspended between alternating current coils 31 and 32 which are connected in series relation with alternating current coils 26 and 27 the induced current in coil 11 flows through coil 30 and causes it to oscillate between coils 31 and 32 to a degree proportional to that through which coil 11 has rotated between coils 26 and 27. Since coil 11 moves with vane 6 it is seen that coil 30 is caused to move to a degree proportionate to that of vane 6. In the preceding paragraph it has been shown that the resistance unit 63 is rotated to a degree which is a function of the angular displacement of the coil 30. Since coil 30 follows the movement of the vane 6 it is thus seen that resistance unit 63 rotates to a degree which is proportional to the displacement of the vane.

The resistance unit 63 and its contact brushes 64 and 65 are so arranged that a movement of the vane 6 from its zero position due to an increased pressure of the gas decreases the value of the resistance between brushes 64 and 65. Since the resistance between brushes 64 and 65 is connected in series with battery 10 and coil 9, the decrease in the value of the resistance causes an increased current to flow through coil 9. This increase of current induces a magnetic field which opposes the field from permanent magnet 23 and causes coil 9 to rotate and to return vane 6 to its zero position. The vane is held at its zero position by the force through the direct current coil 9. If the rate of the gas flow decreases the vane 6 will move from its zero position towards the gas intake tube 7. If the rate of the gas flow increases the vane 6 will move from its zero position in a direction away from the gas intake tube 7. The alternating current coil 30 will follow the movement of the vane and for a decrease in the rate of gas flow will move so as to place pointer 33 underneath arm 34 where due to the raising of lifter bar 41 by cam 40 on constantly rotating shaft 36, L-shaped lever 44 pivoting about point 45 moves its end 53 against post 54 on extension 55 of horizontal bar 50 causing bar 50 to move counterclockwise about pivot 49. The release of spring member 48 by the movement of cam 39 causes the cork pads 51 and 61 on bar 50 to bear against disk 56. Upon further rotation of shaft 36, cam 37 bears against horn extension 62 on bar 50 and returns bar 50 to its horizontal position rotating disk 56 in a clockwise direction through the pressure of the cork pads 51 and 61. Resistance unit 63 is rotated in a clockwise direction and an increased value of resistance placed in the circuit with battery 10 and direct current coil 9. This increase of resistance causes a decreased magnetic field around coil 9 and causes coil 9 to return vane 6 to its zero position. In the same way an increase in the rate of flow of the gas causes coil 30 to move pointer 33 under arm 35 where due to the action of cam 40 on lifter bar 41, pointer 33 causes L-shaped lever 46 to rotate about point 47 and rotate horizontal bar 50 in a clockwise direction through the pressure of lever end 59 against post 56. Rotation of shaft 36 causes spring bar 40 through cam 39 to press the cork pads 51 and 61 of bar 50 against disk 56 and cam 38 bearing on horn extension 52 returns bar 50 to its horizontal position and rotates disk 56 in a counter-clockwise direction. This causes the rotation of resistance unit 63 in a counter-clockwise direction and reduces the value of resistance between brushes 64 and 65. This reduction of resistance as explained before causes coil 9 to return vane 6 to its zero position. Upon the return of the vane to its zero position in each case the coil 30 returns to its normal zero position since there is now no current induced in coil 10 to cause the movement of coil 30. With the coil 30 in its zero position the instrument is in a state of rest, the only action being the inconsequential lifting of the pointer 33 through the opening between arms 34 and 35.

It is thus seen that the vane is held at zero position by the force through the direct current coil and any decrease or increase in the flow of the gas will be indicated by a change in the current necessary to hold the vane at zero position. Since this change of current is caused by the variation of the resistance it is seen that the change in flow is indicated by the position of the resistance unit and that the recording pen associated with the resistance unit indicates the rate of flow of the gas and the changes in the rate of flow.

What is claimed is:

1. A flowmeter for measuring the rate of flow of a fluid, said flowmeter comprising means containing a fluid tight chamber and having a plurality of oppositely extending hollow non-magnetic portions, a vane in said chamber for oscillatory movement, a coil attached to and movable with said vane and supported in one of said hollow portions, a second coil attached to and movable with said vane and supported in the other of said hollow portions, means exterior to and adjacent one of said hollow portions for producing a steady magnetic field in which one of said coils is positioned, means exterior to and adjacent the other of said hollow portions for producing a fluctuating magnetic field in which the other of said coils is positioned, and means defining a plurality of passages leading into said fluid tight chamber for fluid ingress and egress.

2. A flowmeter for measuring the rate of flow of a fluid comprising means containing a fluid chamber, a support extending from one side of said means, a second support extending from the other side of said means and in the opposite direction, an oscillatable vane to be directly acted upon by the fluid, two coils attached to said vane, said vane and coils being suspended between said supports, the vane being positioned in said fluid chamber, one of said coils being outside of and on one side of said chamber, and the other coil being outside of and on the other side of said chamber, cover members enclosing each of said coils and making a substantially gas-tight fit with the chamber containing means, said means containing a fluid inlet to and a fluid outlet from said chamber, and means for producing magnetic fields in which said coils are positioned, one of said fields being unidirectional and produced by a permanent magnet having its poles on opposite sides of one of said cover members, and the other of said fields being alternating in direction and produced by a pair of alternating current coils positioned on opposite sides of the other of said cover members.

WILLIAM B. WARREN.